(12) United States Patent
Ness

(10) Patent No.: US 10,816,064 B2
(45) Date of Patent: Oct. 27, 2020

(54) HYDRAULIC TENSIONING DEVICE FOR A CHAIN DRIVE

(71) Applicant: SCHAEFFLER TECHNOLOGIES AG & CO. KG, Herzogenaurach (DE)

(72) Inventor: Friedrich Ness, Dachsbach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 21 days.

(21) Appl. No.: 15/761,254

(22) PCT Filed: Sep. 14, 2016

(86) PCT No.: PCT/DE2016/200403
§ 371 (c)(1),
(2) Date: Mar. 19, 2018

(87) PCT Pub. No.: WO2017/059851
PCT Pub. Date: Apr. 13, 2017

(65) Prior Publication Data
US 2018/0259044 A1    Sep. 13, 2018

(30) Foreign Application Priority Data

Oct. 6, 2015   (DE) .................. 10 2015 219 219

(51) Int. Cl.
*F16H 7/08*   (2006.01)

(52) U.S. Cl.
CPC ............ *F16H 7/0848* (2013.01); *F16H 7/08* (2013.01); *F16H 2007/0806* (2013.01); *F16H 2007/0812* (2013.01); *F16H 2007/0859* (2013.01); *F16H 2007/0872* (2013.01); *F16H 2007/0893* (2013.01)

(58) Field of Classification Search
CPC ..... F16H 2007/0859; F16H 2007/0806; F16H 7/0848; F16H 2007/0812
USPC .......................................................... 474/110
See application file for complete search history.

(56) References Cited

U.S. PATENT DOCUMENTS 4,674,996 A * 6/1987 Anno ................... F02B 67/06
                                                              474/104
4,761,155 A * 8/1988 Kinoshita ............ F02B 67/06
                                                              474/104
5,087,225 A * 2/1992 Futami .................. F16H 7/08
                                                              474/110

(Continued)

FOREIGN PATENT DOCUMENTS

CN        101248295 A     8/2008
CN        101893070 A     11/2010

(Continued)

OTHER PUBLICATIONS

International Search Report for International Application No. PCT/DE2016/200403 dated Dec. 5, 2016, 5 pages.

*Primary Examiner* — Henry Y Liu
(74) *Attorney, Agent, or Firm* — Brooks Kushman P.C.

(57) ABSTRACT

A hydraulic tensioning device, comprising a tensioning piston receptacle, a tension piston that includes a piston compartment and is movably guided in the tensioning piston receptacle, a high-pressure chamber that can be connected to an inlet connection using an inlet passage secured by a non-return valve, a low-pressure chamber between the inlet connection and the inlet passage, and a balance piston located in the low-pressure chamber.

13 Claims, 2 Drawing Sheets

(56) References Cited

U.S. PATENT DOCUMENTS

| | | | | |
|---|---|---|---|---|
| 5,167,402 A | * | 12/1992 | Nakakubo | B25B 33/00 188/316 |
| 5,569,105 A | * | 10/1996 | Sakai | F02B 67/06 474/110 |
| 5,637,047 A | * | 6/1997 | Schulze | F16H 7/0848 474/110 |
| 5,700,213 A | * | 12/1997 | Simpson | F16H 7/0848 474/110 |
| 5,707,309 A | * | 1/1998 | Simpson | F16H 7/08 474/110 |
| 5,720,684 A | * | 2/1998 | Mott | F16H 7/0848 474/101 |
| 5,879,256 A | * | 3/1999 | Tada | F16H 7/08 474/110 |
| 6,196,939 B1 | * | 3/2001 | Simpson | F16H 7/0848 474/101 |
| 6,322,468 B1 | * | 11/2001 | Wing | F16H 7/08 474/109 |
| 6,471,612 B2 | * | 10/2002 | Nakakubo | F16H 7/0836 474/109 |
| 7,070,528 B2 | * | 7/2006 | Emizu | F16H 7/0836 474/109 |
| 7,186,195 B2 | * | 3/2007 | Hellmich | F16H 7/0848 474/101 |
| 7,699,730 B2 | * | 4/2010 | Emizu | F16H 7/0836 474/110 |
| 8,197,369 B2 | * | 6/2012 | Mishima | F16H 7/0848 474/110 |
| 8,574,106 B2 | * | 11/2013 | Botez | F16H 7/0848 474/110 |
| 9,151,365 B2 | * | 10/2015 | Oh | F16H 7/08 |
| 2011/0263366 A1 | | 10/2011 | Botez | |
| 2015/0024887 A1 | * | 1/2015 | Oh | F16H 7/08 474/110 |
| 2015/0240918 A1 | | 8/2015 | Emizu et al. | |

FOREIGN PATENT DOCUMENTS

| | | |
|---|---|---|
| CN | 102454756 A | 5/2012 |
| CN | 103671773 A | 3/2014 |
| DE | 19957527 A1 | 6/2000 |
| DE | 10011195 A1 | 9/2001 |
| DE | 102007040443 A1 | 3/2009 |
| DE | 102014200950 A1 | 7/2015 |
| EP | 0916869 A2 | 5/1999 |

* cited by examiner

HYDRAULIC TENSIONING DEVICE FOR A CHAIN DRIVE

CROSS-REFERENCE TO RELATED APPLICATIONS

This application is the U.S. National Phase of PCT/DE2016/200403 filed Sep. 14, 2016, which claims priority to DE 102015219219.9 filed Oct. 6, 2015, the entire disclosures of which are incorporated by reference herein.

TECHNICAL FIELD

The disclosure relates to a hydraulic tensioning apparatus for a chain drive of an internal combustion engine. Chain drives in general comprise a drive sprocket connected to the crankshaft, a camshaft driven sprocket connected to a camshaft, as well as a timing chain that connects the drive sprocket to the camshaft driven sprocket. A drive torque of the crankshaft is transmitted to the camshaft via the tight strand of the chain drive control. The timing chain is tensioned on its slack strand in order to be able to ensure its functionality over the operational life. To this end the timing chain is impacted with a force by using a tensioning apparatus.

BACKGROUND

US 2015/0 024 887 A1 discloses such a hydraulic tensioning apparatus. It shows a housing of a tensioning apparatus into which a sleeve is inserted. A tensioning piston is movably guided in the sleeve. The tensioning piston has a piston compartment, wherein together with the sleeve, the piston compartment forms a high pressure chamber which is connected to an inlet connection via an inlet passage secured by using a non-return valve. Between the inlet connection and the inlet passage a low pressure chamber is formed, in which a pressure control piston is arranged.

The pressure control piston is arranged within the housing such that the axes of the pressure control piston and of the tensioning piston are perpendicular to one another. The disclosed pressure control piston shows additionally on its outer lateral surface a control channel enclosed by control edges, which, depending on the setting of the pressure control piston releases or seals an inlet channel to the lower pressure chamber. The pressure control piston is hence a part of the hydraulic medium path extending from the inlet connection to the inlet passage. The arrangement of the components of the tensioning apparatus is disadvantageous with respect to an installation space.

Thus, the disclosure addresses the problem of providing a hydraulic tensioning apparatus that is optimized with respect to its installation space.

SUMMARY

This problem may be solved by the disclosure described below. Accordingly, the problem may be solved by a hydraulic tensioning apparatus for a chain drive of an internal combustion engine with a tensioning piston receptacle and a tensioning piston which is movably guided in the tensioning piston receptacle having a piston compartment, wherein the piston compartment, together with the tensioning piston receptacle, forms a high pressure chamber which can be connected to an inlet connection by using an inlet passage secured by a non-return valve, and with a low chamber pressure formed between the inlet connection and inlet passage as well as with a balance piston arranged in the low pressure chamber. The balance piston is essentially arranged in parallel to the hydraulic medium path extending through the low pressure chamber between the inlet connection and the inlet passage.

The proposed hydraulic tensioning apparatus may include a balance piston that directly regulates the pressure in the low pressure chamber indirectly regulates the pressure in the high pressure chamber, wherein the pressure in the lower pressure chamber is passively regulated by using the balance piston. The balance piston is essentially arranged parallel to the hydraulic medium path extending through the lower pressure chamber between the inlet connection and the inlet passage. Parallel arrangement in this context means that the balance piston essentially does not throttle or that the balance piston cannot block the hydraulic medium path. If pressure peaks occur in the inlet line which transition into the low pressure chamber via the inlet connection, the absorption volume in the low pressure chamber can be enlarged by using the balance piston; pressure peaks can be reduced prior to a transition into the high pressure chamber. In addition, the balance piston can be used to force the oil located in the low pressure chamber to the high pressure chamber (in this and other operating states the pressure in the low pressure chamber is greater than in the high pressure chamber). The balance piston can thus support the tensioning apparatus in the replenishing phase. Accordingly, in the low pressure region oil should be forced via the balance piston to the high pressure chamber. In addition, the oil supply should also be supported in the case of high frequencies. The oil supply should occur more uniformly overall.

In an advantageous embodiment the balance piston is movably guided in a balance piston receptacle, wherein the balancing piston delimits the low pressure chamber vis-à-vis a reference pressure chamber. The reference pressure chamber may be connected to the surroundings, for example by an opening on the reference pressure chamber. In this way a reliable coordination of the control characteristics can occur. The balance piston can be aligned coaxially, axis-parallel or offset by an angle to the axis of the tensioning piston, or for example also perpendicular to the tensioning piston axis.

In an advantageous improvement of the embodiment the balance piston is pre-tensioned by using a spring against the lower pressure chamber. The balance piston may be arranged co-axially or axis-parallel to the tensioning piston. The pre-tensioning by using a spring may be a design which makes possible a passive control of the balance piston.

In an especially advantageous improvement of the embodiment with respect to the required installation space the spring pre-tensions the balance piston against a contact surface, wherein the contact surface at least partly encloses the opening of the inlet passage facing the low pressure chamber.

In an advantageous embodiment the tensioning piston receptacle of the hydraulic tensioning apparatus contains a housing and a sleeve arranged in a housing borehole (or in a cylindrical housing cavity), wherein the tensioning piston is movably guided in the sleeve. The embodiment enables advantages with respect to production, such as for example machining of surfaces adjacent to the tensioning piston.

In an advantageous improvement of the embodiment the sleeve of the hydraulic tensioning apparatus has a tubular segment and a base, wherein the inlet passage is arranged on the base and wherein the balance piston receptacle is arranged on the housing; the contact surface is arranged on the side of the base of the sleeve facing the low pressure chamber. Thus a hydraulic tensioning apparatus is provided that has special advantages in production. The balance piston receptacle can for example be arranged concentrically to the housing borehole, as a result of which special advantages in production can be achieved.

Alternatively, the tensioning piston is guided directly in a cylindrical housing cavity. The contact surface is arranged on the side of a non-return valve facing the low pressure chamber, which limits the high pressure chamber vis-à-vis the low pressure chamber.

An embodiment of the hydraulic tensioning apparatus with a balance piston having in axial direction a first segment facing the low pressure chamber and a second segment averted from the low pressure chamber has proven to be especially advantageous with respect to an installation space, wherein the front of the first segment can be brought into contact with a contact surface at least partially surrounding the inlet passage (contact region) and wherein the contact region does not completely surround the inlet passage. In spite of space-saving contact of the balance piston on the contact surface it is ensured that the hydraulic medium path between the inlet connection and the inlet passage is not interrupted.

In an advantageous improvement of the embodiment the low pressure chamber is connected to the inlet connection in the region of the balance piston receptacle via a radial inlet line, wherein the radial inlet line in the region of the first segment of the balance piston essentially opens into the low pressure chamber and wherein the outer lateral surface of the balance piston in the first segment is not in contact with the inner lateral surface of the balance piston receptacle, either by having the first segment—in the case of an inside diameter of the balance piston receptacle remaining essentially constant—having a lower diameter than the second segment at least in a sub-region along the circumference, or by having the balance piston receptacle having a greater diameter in an axial region of the first segment at least in a sub-region along the circumference than in an axial region of the second segment. Hence an installation space-saving and inexpensive to produce hydraulic tensioning apparatus is provided with a balance piston which, in the case of contact on the contact surface—thus in a non-hydraulically actuated state—does not block the hydraulic medium path to the inlet passage.

In an advantageous embodiment the balance piston has a recess on its front facing the low pressure chamber which is designed open at least on one position to the outer lateral surface of the balance piston. In this way, a supply of the high pressure chamber with hydraulic medium can be ensured inexpensively. In an advantageous improvement of the embodiment the recess is a groove.

The hydraulic tensioning apparatus may be used in a chain drive for an internal combustion engine with a drive sprocket and with a camshaft driven sprocket as well as with a timing chain, wherein the timing chain couples the drive sprocket and the camshaft drive sprocket and wherein the timing chain is tensioned by using a hydraulic tensioning apparatus adjoining a clamping arm according to any of the preceding embodiments.

BRIEF DESCRIPTION OF THE DRAWINGS

The disclosure will now be described in greater detail on the basis of exemplary embodiments, wherein reference is made to the drawings. Functionally identical elements of the described embodiments will be marked with the same reference numerals.

DETAILED DESCRIPTION

Figure 1:
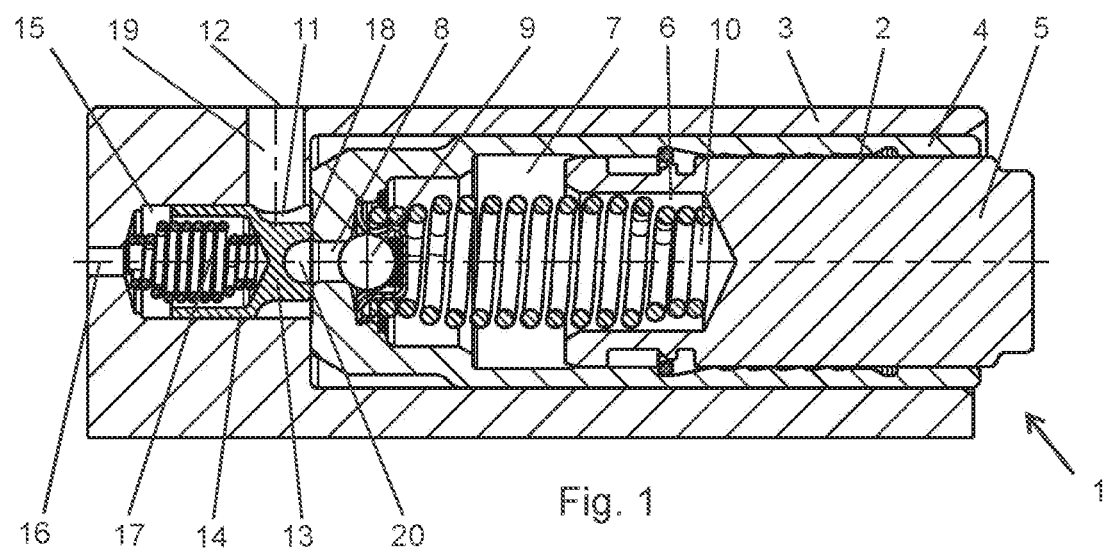
FIG. 1 shows an embodiment of a hydraulic tensioning apparatus in longitudinal section.

FIG. 1 shows an embodiment of a hydraulic tensioning apparatus 1 in longitudinal section. The hydraulic tensioning apparatus consists of a tensioning piston receptacle 2, which is composed of a housing 3 and a sleeve 4 arranged in a borehole of the housing, as well as a tensioning piston 5. The tensioning piston 5 is guided axially movably in the tensioning piston receptacle 2 and is designed with a piston cavity 6. Together with the sleeve 4 of the tensioning piston receptacle 2, the piston cavity 6 forms a high pressure chamber 7. On the end of the sleeve, which lies opposite the opening to the receptacle of the tensioning piston 5, a recess is arranged. The supply of hydraulic medium occurs over the recess to the high pressure chamber 7 via an inlet passage 8.

A non-return valve 9 is arranged on the end of the inlet passage 8 facing the high pressure chamber 7, which releases the hydraulic medium flow in the inlet direction and prevents escape from the high pressure chamber 7. The non-return valve 9 comprises a seat for a main spring 10, whose pre-tensioning force on the one hand acts on the sleeve 4 and on the other hand acts on the tensioning piston 5, whose end averted from the high pressure chamber 7 adjoins a tensioning rail 29 of a chain drive (see FIG. 4).

Such tensioning apparatuses for the chain drive of an internal combustion engine are used for the purpose of tensioning the timing chain 25 and damping oscillations occurring in the chain drive. For this reason, the sleeve 4 and the piston cavity 6 of the tensioning piston form the high pressure chamber 7, which is filled with hydraulic medium in the operation of the chain drive. As a rule, the hydraulic medium is provided as motor oil from the general hydraulic medium loop.

Upstream from the high pressure chamber 7 a low pressure chamber 11 is arranged in the housing 3, which is formed between a housing-side inlet connection extending radially to the tensioning piston axis and the inlet passage 8. The low pressure chamber 11 contains a balance piston 13, which is arranged essentially parallel to the pressure medium path between the inlet connection 12 and the inlet passage 8 extending through the lower pressure chamber 11.

The balance piston 13 is movably guided in a balance piston receptacle 14 of the housing 3 and delimits the low pressure chamber 11 from a reference pressure chamber 15. The reference pressure chamber is connected to the surroundings via a borehole 16, so that the ambient pressure serves as a reference pressure. The balance piston 13 is pre-tensioned against a contact surface 18 by using a spring 17. The contact surface surrounds the opening of the inlet passage 8 facing the low pressure chamber 11, said inlet passage being arranged on the base of the sleeve 4.

The balance piston 13 has a first and a second segment in axial direction, wherein the first segment is facing the low pressure chamber 11 and the second segment is averted from the low pressure chamber. The low pressure chamber is connected to the inlet connection 12 in the region of the balance piston receptacle 14 via a radial inlet line 19, wherein the radial inlet line 19 in the region of the first segment of the balance piston opens into the low pressure chamber 11.

The outer lateral surface of the balance piston 13 is not in contact with the inner lateral surface of the balance piston receptacle 14 in the first segment, due to the fact that the first segment has a lower diameter along the circumference than the second segment. The balance piston 13 in addition has a recess on its front facing the low pressure chamber 11, which is designed as a groove 20 and is configured open in two places to the outer lateral surface of the balance piston 13.

The front of the first segment can thus, as presented in FIG. 1, be brought into contact with the contact surface 18 surrounding the inlet passage 8. The contact region thus defined does not completely surround the inlet passage 8 due to the groove 20 on the front of the balance piston 13 facing the low pressure chamber 11; it is therefore made possible for a hydraulic medium flow to reach the high pressure chamber 7 via the inlet passage 8 in spite of the balance piston 13 in contact.

Figure 2:
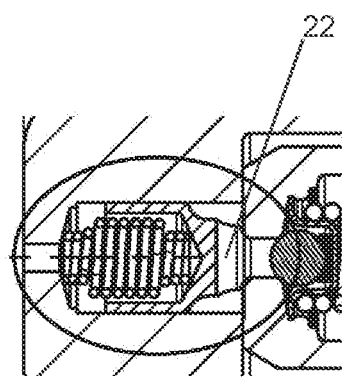
FIG. 2 shows a further perspective of a balance piston of the embodiment shown in FIG. 1.
Figure 3:
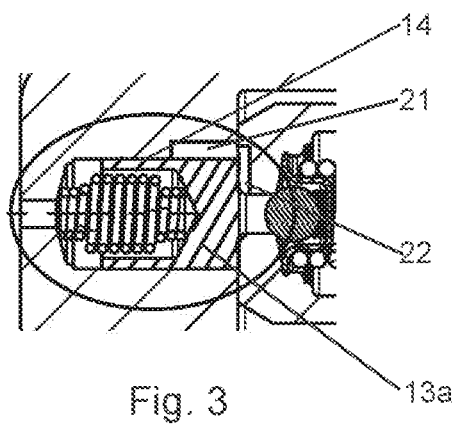
FIG. 3 shows a second embodiment of a balance piston.

FIG. 2 presents a further perspective of the balance piston 13. A longitudinal section through the groove 20 arranged on the front of the balance piston 13 is shown. FIG. 3 presents an alternative embodiment. A balance piston 13a is shown with a diameter that remains constant over the entire length and which is essentially adapted to the inside diameter of the balance piston receptacle 14. A groove 21 is arranged in one place of the inside circumference of the balance piston receptacle 14, said groove forming a channel together with the outer lateral surface of the balance piston 13a and thus releasing a hydraulic medium path between the inlet connection 12 and the inlet passage 8, which extends over a recess 22 on the base of the sleeve 4.

Figure 4:
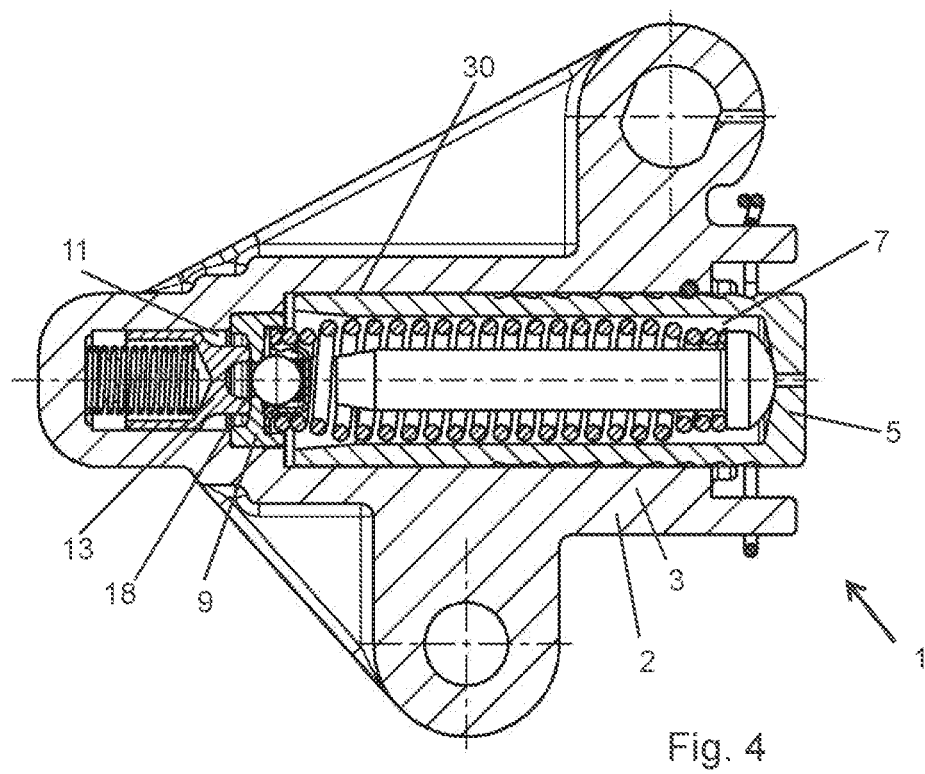
FIG. 4 shows a third embodiment of the hydraulic tensioning apparatus.

FIG. 4 shows a third embodiment of the hydraulic tensioning apparatus 1. The presented tensioning apparatus differs from the previously described exemplary embodiments in that the tensioning piston 5 is guided directly in a cylindrical housing cavity 30. The contact surface 18 for the balance piston 13 is arranged on the side of the non-return valve 9 facing the low pressure chamber 11, which limits the high pressure chamber 7 vis-à-vis the low pressure chamber 11.

Figure 5:
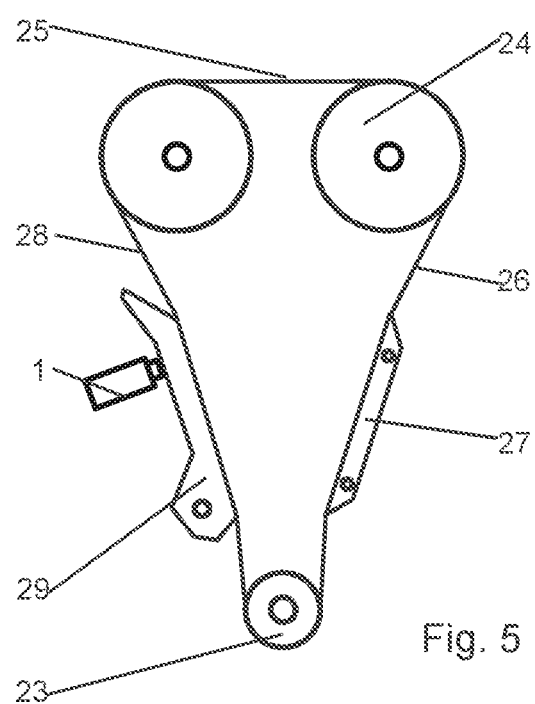
FIG. 5 shows the principle function of a chain drive.

FIG. 5 presents in principle a chain drive for an internal combustion engine with its essential components. A chain drive comprises a drive sprocket 23 connected to the crankshaft, two camshaft driven sprockets 24, each connected to a camshaft, as well as a timing chain 25, which connects the drive sprocket 23 to the camshaft drive sprockets 24. A drive torque of the crankshaft is transferred to the camshafts via the tight strand 26 of the timing chain 25.

The timing chain 25 is guided on the tight strand 26 by using a guide rail 27.

The timing chain 25 is tensioned on its slack strand 28, in order to be able to ensure its functionality over the operational life. To this end, the timing chain 25 is impacted with a tensioning force by using a tensioning apparatus 1 and a tensioning arm 29. In addition, hydraulic tensioning apparatuses according to the described embodiment ensure a damping of the chain drive.

REFERENCE LIST

1 Tensioning apparatus
2 Tensioning piston receptacle
3 Housing
4 Sleeve
5 Tensioning piston
6 Piston cavity
7 High pressure chamber
8 Inlet passage
9 Non-return valve
10 Main spring
11 Low pressure chamber
12 Inlet connection
13 Balance piston
14 Balance piston receptacle
15 Reference pressure chamber
16 Borehole
17 Spring
18 Contact surface
19 Inlet line
20 Groove
21 Groove
22 Recess
23 Drive sprocket
24 Camshaft driven sprocket
25 Timing chain
26 Tight strand
27 Guide rail
28 Slack strand
29 Tensioning arm
30 Housing cavity

The invention claimed is:

1. A hydraulic tensioning apparatus, comprising:
a chain drive of an internal combustion engine with a tensioning piston receptacle and a tensioning piston that is movably guided in the tensioning piston receptacle having a piston compartment, wherein the piston compartment, together with the tensioning piston receptacle, forms a high pressure chamber which can be connected to an inlet connection using an inlet passage secured by a non-return valve, and with a low pressure chamber formed between the inlet connection and inlet passage as well as with a balance piston arranged in the low pressure chamber, wherein the balance piston is arranged in parallel to a hydraulic medium path extending through the low pressure chamber between the inlet connection and the inlet passage, wherein the balance piston is configured to directly regulate pressure in the low pressure chamber and indirectly regulate pressure in the high pressure chamber, wherein the balance piston is further contacting a sleeve arranged in a borehole of a housing and a contact surface at least partly encloses an opening of the inlet passage facing the low pressure chamber, wherein the contact surface is arranged on a side of the sleeve facing the low pressure chamber, wherein the balance piston is movably guided in a balance piston receptacle, wherein the balancing piston delimits the low pressure chamber using a reference pressure chamber and the balance piston is pre-tensioned by using a spring against the lower pressure chamber, wherein the spring pre-tensions the balance pistons against the contact surface, wherein the tensioning receptacle contains the housing and the sleeve arranged in the borehole of the housing, wherein the tensioning piston is movably guided in the sleeve, wherein the sleeve has a tubular segment and a base, wherein the inlet passage is arranged on the base and that the balance piston receptacle is arranged on the housing, wherein the contact surface is arranged on a side of the base of the sleeve facing the low pressure chamber.

2. The hydraulic tensioning apparatus of claim 1, wherein the balance piston has in axial direction a first segment facing the low pressure chamber and a second segment averted from the low pressure chamber and that a front of the first segment can be brought into contact with a contact surface at least partially surrounding the inlet passage, wherein a contact region does not completely surround the inlet passage.

3. The hydraulic tensioning apparatus of claim 2, wherein the low pressure chamber is connected to the inlet connection in a region of the balance piston receptacle via a radial inlet line, that the radial inlet line in the region of the first segment of the balance piston opens into the low pressure chamber, wherein an outer lateral surface of the balance piston in the first segment is not in contact with an inner lateral surface of the balance piston receptacle.

4. The hydraulic tensioning apparatus of claim 3, wherein the balance piston has a recess on its front facing the low pressure chamber configured to open at least on one position to an outer lateral surface of the balance piston.

5. The hydraulic tensioning apparatus of claim 4, wherein the recess is a groove.

6. A hydraulic tensioning apparatus, comprising:
a tensioning piston receptacle;
a tensioning piston that is movably guided in the tensioning piston receptacle; and
a piston compartment, wherein the piston compartment and the tensioning piston receptacle form a high pressure chamber that can be connected to an inlet connection using an inlet passage secured by a non-return valve, and wherein a low pressure chamber is formed between the inlet connection and the inlet passage, wherein a balance piston is arranged in the low pressure chamber, wherein the balance piston is further contacting a sleeve arranged in a borehole of a housing, and a contact surface at least partly encloses an opening of the inlet passage facing the low pressure chamber, wherein the contact surface is arranged on a side of the sleeve facing the low pressure chamber, wherein the balancing piston delimits the low pressure chamber using a reference pressure chamber, wherein the reference pressure chamber is connected to surroundings using a borehole, so that an ambient pressure is utilized as a reference pressure.

7. The hydraulic tensioning apparatus of claim 6, wherein the balance piston is arranged in parallel to a hydraulic medium path extending through the low pressure chamber between the inlet connection and the inlet passage.

8. The hydraulic tensioning apparatus of claim 6, wherein the balance piston is pretensioned by using a spring against the lower pressure chamber.

9. The hydraulic tensioning apparatus of claim 6, wherein the balance piston is arranged co-axially parallel to the tensioning piston.

10. The hydraulic tensioning apparatus of claim 6, wherein a spring is configured to pre-tension the balance piston against a contact surface, wherein a contact surface at least partly encloses an opening of the inlet passage facing the low pressure chamber.

11. The hydraulic tensioning apparatus of claim 6, wherein the low pressure chamber is connected to the inlet connection in a region of a balance piston receptacle using a radial inlet line, wherein the radial inlet line is in a first segment region of the balance piston that opens into the low pressure chamber and wherein an outer lateral surface of the balance piston in the first segment region is not in contact with an inner lateral surface of the balance piston receptacle.

12. The hydraulic tensioning apparatus of claim 6, wherein the apparatus is in a chain drive for an internal combustion engine.

13. A hydraulic tensioning device, comprising:
a tensioning piston receptacle;
a tension piston that includes a piston compartment and is movably guided in the tensioning piston receptacle;
a high-pressure chamber that can be connected to an inlet connection using an inlet passage secured by a non-return valve;
a low-pressure chamber between the inlet connection and the inlet passage, wherein a contact surface at least partly encloses an opening of the inlet facing the low-pressure chamber; and
a balance piston located in the low-pressure chamber, wherein the balance piston is further contacting a sleeve arranged in a borehole of a housing, wherein the sleeve has a tubular segment and a base, and wherein the contact surface is arranged on a side of the base of the sleeve facing the low-pressure chamber, wherein the balancing piston delimits the low pressure chamber using a reference pressure chamber, wherein the reference pressure chamber is connected to surroundings using a borehole, so that an ambient pressure is utilized as a reference pressure.

* * * * *